United States Patent [19]

Donnally et al.

[11] 4,280,355

[45] Jul. 28, 1981

[54] FUZE DATA QUANTIZING SYSTEM

[75] Inventors: William Donnally, Boonton; Chester L. Smith, Lake Hopatcong, both of N.J.

[73] Assignee: The United States of America as represented by the Secretary of the Army, Washington, D.C.

[21] Appl. No.: 122,639

[22] Filed: Feb. 19, 1980

[51] Int. Cl.³ ........................................... G01M 19/00
[52] U.S. Cl. ........................................... 73/5; 73/167; 73/489
[58] Field of Search ................ 73/35, 167, 5, 489, 73/511; 364/423; 235/400, 408

[56] References Cited

U.S. PATENT DOCUMENTS

| | | | |
|---|---|---|---|
| 2,834,293 | 5/1958 | Beach et al. | 73/167 |
| 3,761,917 | 9/1973 | Brown et al. | 73/489 X |
| 4,114,450 | 9/1978 | Shulman et al. | 73/489 |

*Primary Examiner*—James J. Gill
*Attorney, Agent, or Firm*—Nathan Edelberg; Robert P. Gibson; Max Yarmovsky

[57] ABSTRACT

The present invention discloses an in-flight testing of projectile and mortar fuzes. A microminiature electronic circuitry in a cartridge form is designed to attach to any of the large caliber shell or mortar fuzes. The test-cartridge is a recoverable, reusable, high-g hardened device. The system for sampling and recording projectile fuzes during a period of target impact comprises: a power supply; a timing and control logic unit; an accelerometer; an amplitude encoder; a shift register; and an interface connector to transform stored information of the fuze functioning characteristics to a ground station readout unit.

5 Claims, 7 Drawing Figures

DECELERATION VS. TIME AFTER IMPACT

TIME INTERVAL CIRCUIT $(t_1" - t_0")$

MECHANICAL INTERFACE

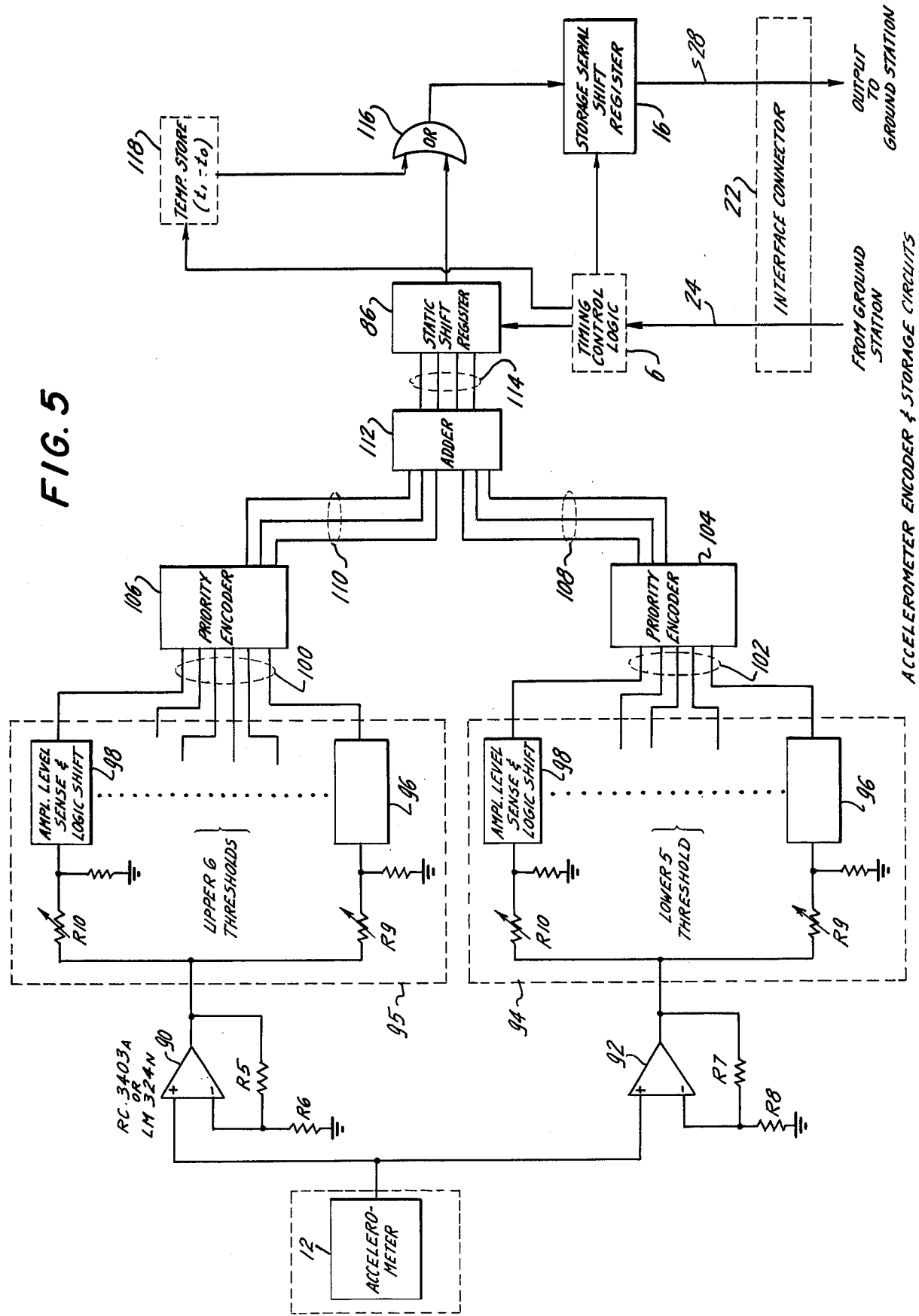

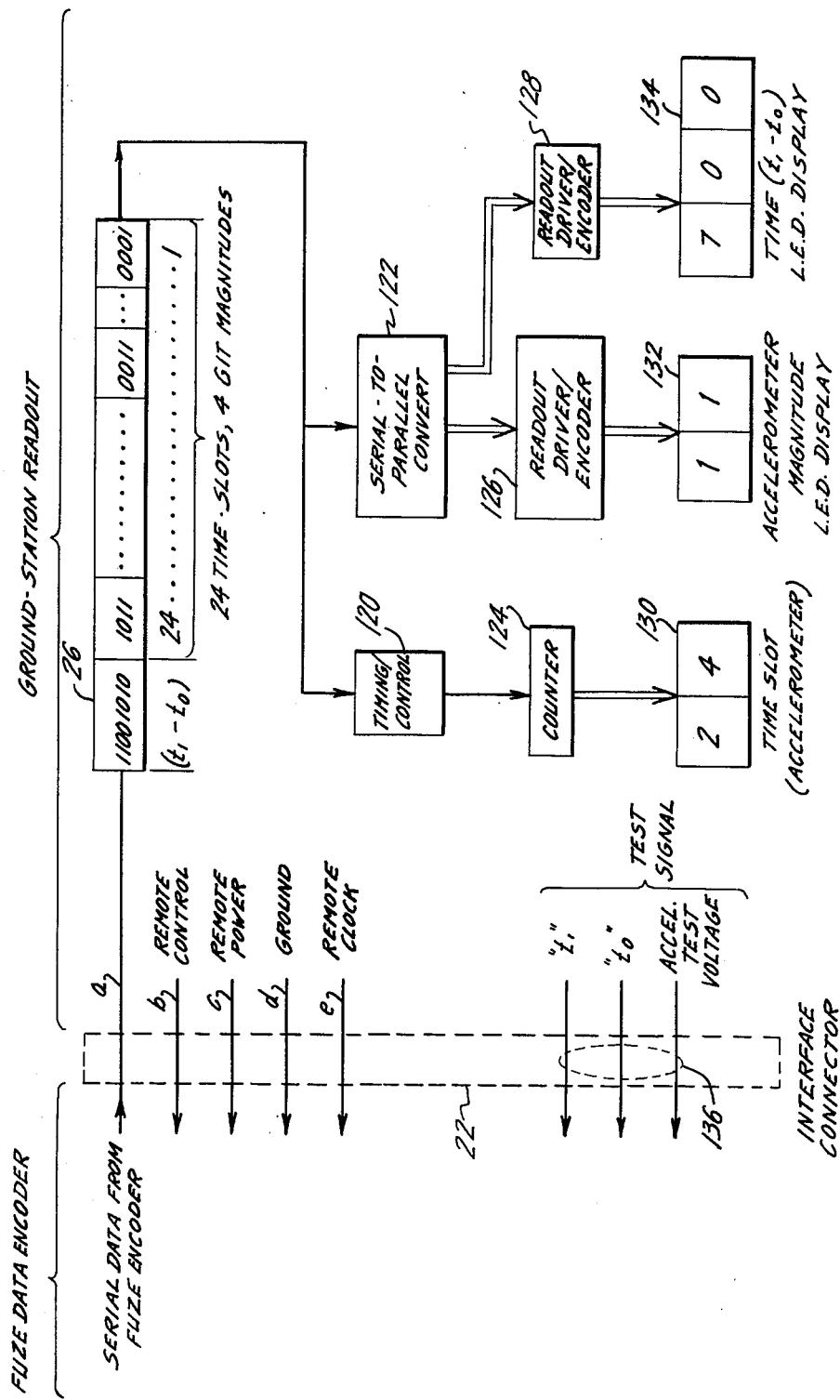

FUZE DATA QUANTIZING SYSTEM

GOVERNMENTAL INTEREST

The invention described herein may be manufactured, used and licensed by or for the Government for Governmental purposes without the payment to us of any royalties thereon.

BACKGROUND OF THE INVENTION

The present invention relates to a field of the art dealing with the testing of projectile and mortar fuzes.

Large caliber projectile fuzes are presently tested by a technique known as "reverse ballastics". The problem with said technique is that it is considered to be only an approximation of the effects of an actual firing of the fuze against the target and the effects of impact on its functioning characteristics. Since, the fuze functioning information is required for all types of targets, hard and soft, it is necessary to develop a technique that gradually accelerates the target. The reason for this is to prevent the target from changing its density due to the acceleration required to bring it up to a minimum velocity. The target is accelerated by stages in an incremental manner so that the target material is not compacted. Soft and semi-hard targets are generally of more interest as they provide more stringent requirements on the fuze.

Fuze items are produced and tested in relatively large quantities. The advantage of testing in the reverse ballastics facility is that the fuze is in a fixed position and, therefore, can be instrumented simply and directly with a hard wire. With direct ballistics (firing the fuze fixed to a projectile at the target) the conventional approach would be to use RF telemetry to obtain the fuze functioning information. The conventional telemetry involves extremely high cost per shot as each fuze fired requires a new projectile. This means that utilizing RF telemetry, a new transmitting antenna would be required for every shot, and even modification of each projectile alone represents a high cost. Obviously, the conventional RF telemetry approach was considered impractical. The recognition of this fact by the inventors contributed to the conception of the present invention.

SUMMARY OF THE INVENTION

The present invention uses a direct ballistic approach and discloses a system for sampling and recording projectile fuzes during a period of target impact and penetration. The system utilizes a miniature cartridge of hybrid circuit design that is completely self-contained. The sensors, power supply, controls and functional circuitry are provided within the cartridge. The sensors interface with the fuze without modification of the item being tested. The components selected for the system are able to withstand high-g forces so that the cartridge is recoverable and reusable. The data is quantified, compressed, and converted to a single bit stream to simplify the memory, storage and readout. The cartridge retains the fuze impact information in memory, until retrived and interrogated. The fuze impact data encoding system, samples and records a deceleration profile at a plurality of discrete time intervals, measures and records a time difference between initial impact time $t_0$ and a fuze detonation is switched on by the initial acceleration of the projectile in the gun tube time $t_1$, a power source to energize the system, a g-switch, which is momentarily closed to initiate an operating sequence during first impact of a projectile fuze at time $t_0$, a timing and control logic unit in combination with a time interval counter connected in series with the g-switch to indicate a time difference $t_1-t_0$; an accelerometer to provide a voltage output proportional to a deceleration magnitude experienced by the fuze, an amplitude encoder connected across the voltage output of the accelerometer to result in a binary number representing highest threshold exceeded at a particular sample time; a shift register connected to an output of the encoder, in which information is serially stored; and an interface connector to transform stored information in the shift register to a ground station read-out unit.

It is an object of the present invention to provide a recoverable, reusable and highly cost-effective system to obtain realistic data on fuze functioning during a period of target impact.

It is a further object to provide a new and improved system replacing conventional RF telemetry system.

It is a yet further object to incorporate logic circuit safeguards to prevent false initiation of the encoder logic unit.

It is still further object to provide means for conserving battery life by employing logic circuitry in the system.

BRIEF DESCRIPTION OF THE DRAWINGS

FIG. 5 is a block diagram showing details of the accelerometer encoder and data storage circuits.

FIG. 6 is a block diagram of a read-out device (ground station) for recovering stored fuze impact and function data information.

DETAILED DESCRIPTION OF THE INVENTION

Figure 1:
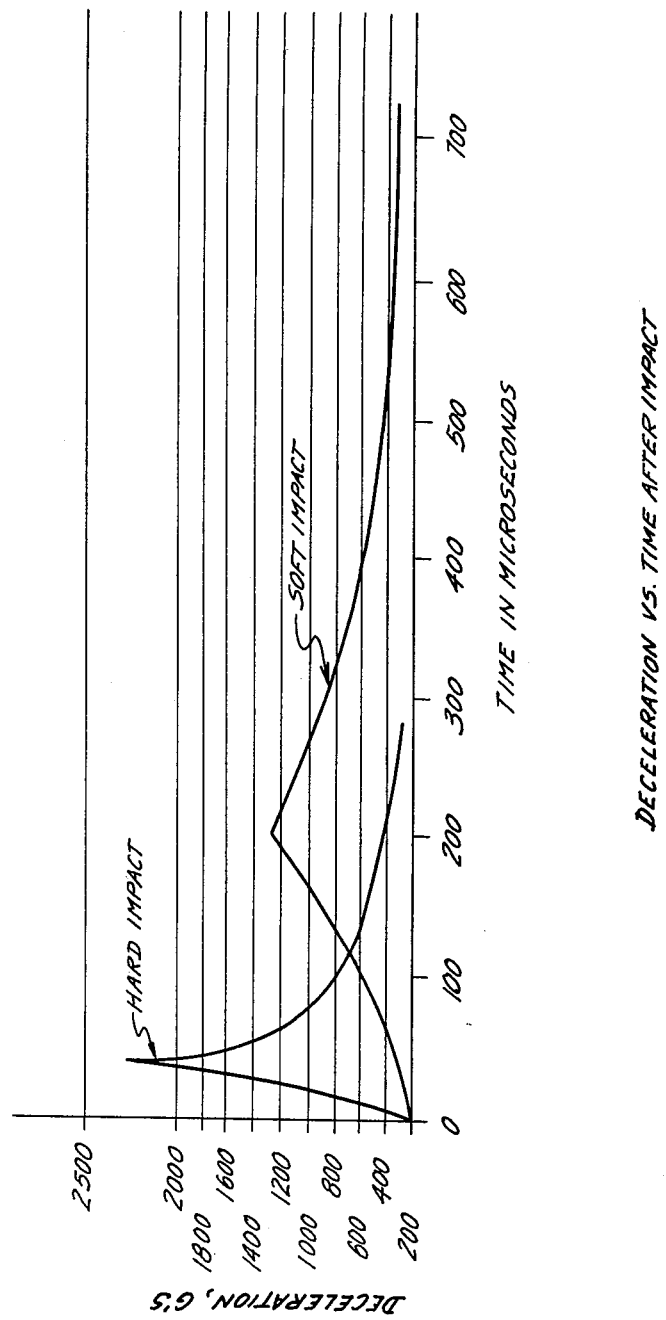
FIG. 1 is a graphical representation of projectile-fuze deceleration curves which are characterized by magnitude samples taken at a plurality of discrete time intervals.

With reference to FIG. 1, a graph of the deceleration of the fuze versus time is illustrated. The encoded g-range covers 200 G to 2500 G which is a sufficient range for those "hard" and "soft" targets shown. The g-range usually includes a decade of g-values, any number of g-levels of various magnitudes may be sampled at predetermined sampling time intervals as specified by a fuze designer. Immediately at impact, where the rate of change of deceleration is expected to be a maximum, the sampling frequency is maximum. In the time intervals following first impact, the sampling frequency is decreased. In this manner, the optimum storage capacity is used to characterize the fuze initial impact environment.

Figure 2:
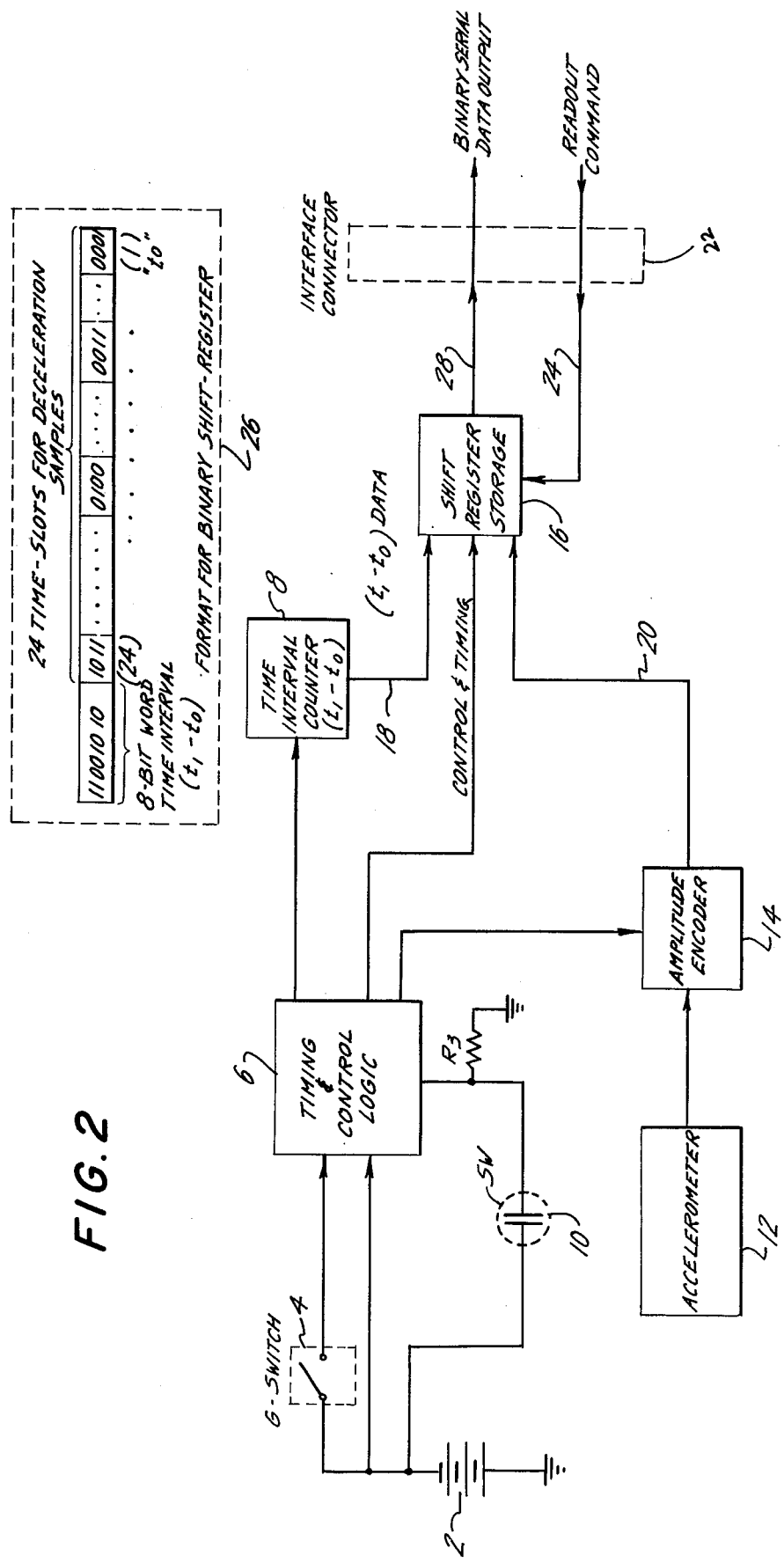
FIG. 2 is a simplified block diagram of the fuze impact encoder showing the major elements of the present inventive system.

FIG. 2 is a simplified block diagram of the fuze impact data encoding system. The system as shown in FIG. 2, encodes and stores data in serial binary form.

Two kinds of information are processed and stored as a result during target impact, namely; (a) sampling and recording the deceleration profile at a plurality of discrete time intervals; and (b) measuring and recording the time difference between initial impact time $t_0$ and a fuze detonation time $t_1$.

A d.c. power source, usually a battery 2, supplies power for the encoder system. The operating sequence is initiated during first motion of the projectile-fuze by a momentary closure of the G-switch 4. At first instant impact on the target, this g-switch again momentarily closes (time $t_0$) which results in the timing and control logic 6 clearing time interval counter 8 to a count of zero. Counter 8 is then incremented at discrete time intervals (every 5 microseconds in this preferred embodiment of the invention). The count is "frozen" at time $t_1$ when the fuze detonation causes electrical initiation of ionization switch 10. Consequently, at time $t_1$ the count represents the time difference $(t_1-t_0)$. Resistor $R_2$ provides a current path in order to complete the electrical circuit upon closure of switch 10.

The voltage output of accelerometer 12 is linearly proportional to the deceleration magnitude experienced by the fuze. This output voltage is then quantified at a plurality of predetermined discrete sample times by the amplitude encoder 14. The encoder 14 has a number of amplitude thresholds, each corresponding to a g-threshold. There are eleven such thresholds in the preferred embodiment. The output of the encoder 14 is a 4-bit binary number or word representing the highest threshold exceeded at the particular sample time. In the preferred embodiment, twenty-four discrete samples are taken during a total time of approximately 700 microseconds (as illustrated in FIG. 1). Each 4-bit word sample is serially stored in shift-register 16. After all twenty-four discrete words sequentially stored in the shift-register, the position of each word in the particular shift register stages corresponds to the predetermined sample time.

The binary word at point 18 representing the time interval $(t_1-t_0)$ is transferred in serial form to shift register 16 after all accelerometer sample words at point 20 have been transferred. The serial data storage format 26 for the particular inventive embodiment thus includes all twenty-four 4-bit sequential accelerometer magnitude-words at circuit point 20, and one 8-bit time interval $(t_1-t_0)$ at point 18. Readout of this stored information is accomplished after recovery of the fuze by connecting a portable ground station readout unit to interface connector 22. A readout command on line 24 causes the information shown in format 26 to be transferred out to the ground station unit on line 28.

Figure 3:
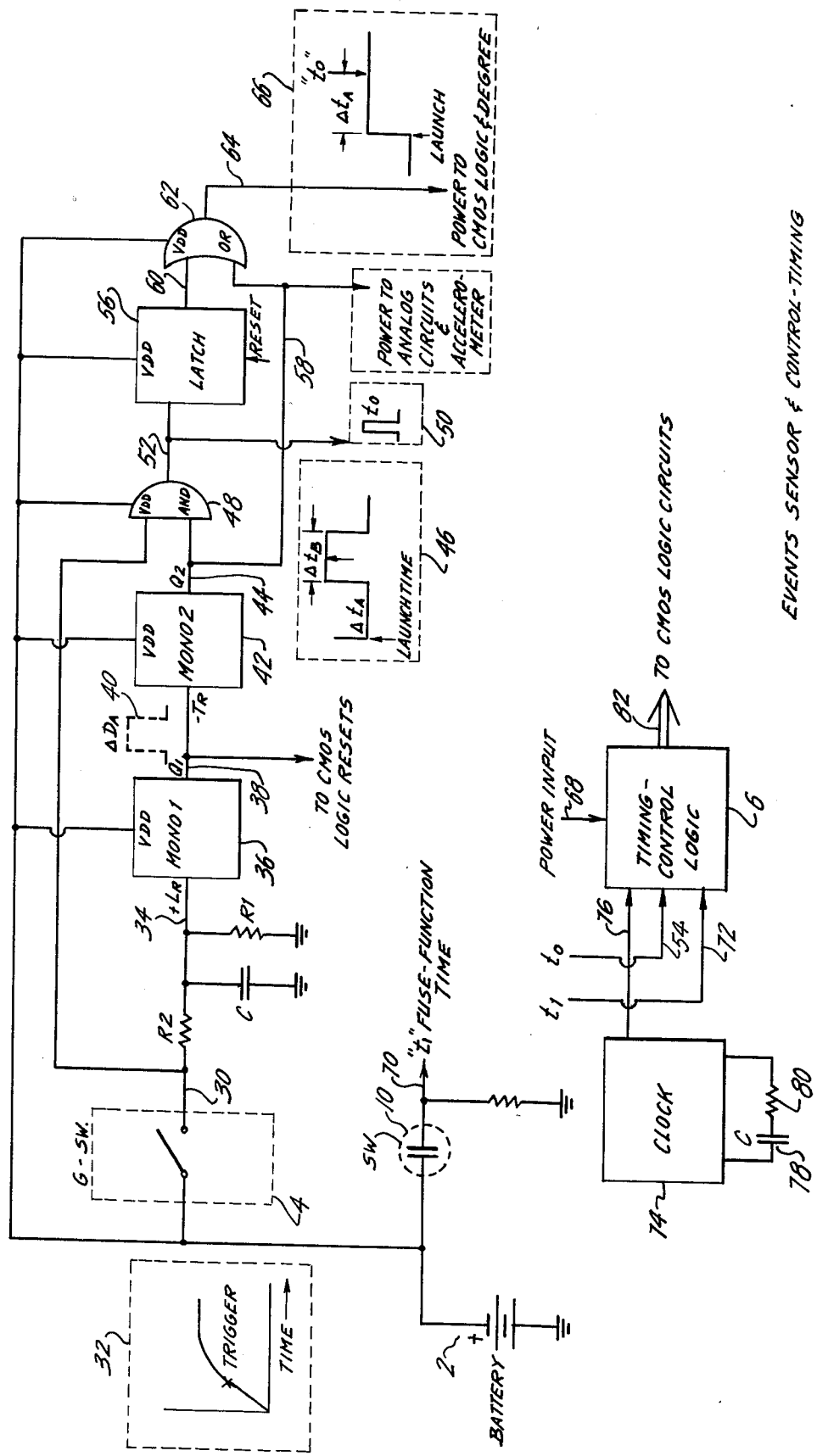
FIG. 3 is a block diagram showing the target impact, fuze detonation sensing and timing control circuits.

FIG. 3 presents the details of how the preferred inventive embodiment performs the following functions:

1. Supplies power from the battery 2 to the system. This power is supplied to the analog circuitry and to the accelerometer only for sufficient time to encode and store the deceleration profile measured during impact (in order to conserve the battery). The power turn-on logic includes safeguards against false triggering due to rough handling prior to firing (such as accidently dropping the unit).

2. Resets the logic to the proper initial state after the projectile is fired but prior to target impact.

3. Generates a pulse when the fuze first strikes the target. This time is denoted as $t_0$. The control logic incorporates provisions to discriminate the event of initial target impact ($t_0$) from initial launch (first motion is sensed by a g-switch) and any other shock which may occur before or after the expected time of target impact.

4. Provides timing and control for transfer of binary information in a suitable logical format and in an ordered sequence.

5. Derives a logic pulse corresponding to the time of impact ($t_0$) and initiates a timing circuit. Time $t_0$ is obtained from a momentary closure of a G-switch. The logic circuitry does not accept a G-switch closure as being $t_0$ unless it occurs at the expected time relative to first motion (firing) on the projectile.

6. Derives a logic indication at the time of fuze function or detonation ($t_1$) and obtains a binary count corresponding to the time interval ($t_1-t_0$). Time $t_1$ is obtained from closure of an ionization switch.

7. Provides a central timing base reference for the deceleration and ($t_1-t_0$) measurements.

Referring now to FIG. 3, the circuitry for performing these functions is described.

When the projectile is fired, G-switch 4 is continuously closed for several milliseconds causing a transistion to a positive potential (defined as the "high" logic level) at point 30.

Resistor R1 maintains a "low" logic level at input 34 whenever the G-switch is not closed. This G-switch may be Model 11718251, Rev. B, (with a closure g-threshold of about 100 g's) manufactured by Acrodyne Controls, Inc., Janesville, Wis. When the projectile is fired and the G-switch closes, voltage wave form 32 occurs at input 34 to monostable 36. Waveform 32 rises exponentially during continuous closure of G-switch 4. The G-switch remains closed when the projectile is fired (the setback acceleration during launch is known to be continuous for several milliseconds). The R-C time constant of resistor R2 and capacitor C is chosen such that the G-switch must remain closed for several milliseconds before triggering monostable 36. The requirement for an acceleration level to occur continuously for a minimum length of time can only be satisfied during an actual gun firing. Consequently, resistor R2 and capacitor C act as a safeguard against false initiation. When triggered, monostable 36 generates at its output 38 ($Q_1$) a pulse of duration $\Delta t_A$ (waveform 40) which is used to reset the event timing and encoding logic to the proper initial state. This monostable 36 is a type CD4098B (CMOS) manufactured by RCA Corp. Since the reset pulse 40 has a predetermined duration $\Delta t_A$ the fuze data encoding system logic is disabled and fuze data cannot be taken during this time. This pulse duration $\Delta t_A$ is set according to the expected time taken for the projectile to clear the gun tube and the duration of ballistic flight prior to target impact. The falling edge of pulse 40 triggers monostable 42 at its $-T_r$ input. This results in output 44 ($Q_z$) having the waveform 46 in which pulse $\Delta t_B$ rises to a "high" logic state approximately 50 milliseconds prior to time of target impact $t_0$, and stays "high" about 100 milliseconds after target impact. Point 44 (pulse $\Delta t_B$) is connected to the power inputs of the analog circuitry and to the accelerometer (not shown in FIG. 3). Therefore, the battery 2 is conserved. This pulse $\Delta t_B$ is fed to one of two inputs of CMOS "And" gate 48. The other gate input is connected to G-switch 4 at point 30. This gate may be RCA type CD4081B. Consequently, when the G-switch again momentarily closes at time $t_0$ (when the fuze first strikes the target) a short duration pulse 50 occurs at time $t_0$. The pulse 50 can only occur during time interval $\Delta t_B$. Therefore, the circuit does not accept a G- switch closure indicating an authentic target impact time $t_0$ unless the closure occurs at the expected time relative to first motion of the projectile (firing). Point 52 ($t_0$) is an input 54 to the timing and control logic unit 6. The design of the timing and control logic circuitry 6 will be apparent to those skilled in the art and accordingly these details are not presented.

Latch 56 (RCA CMOS Type CD4043B) is reset at input 58 to a "low" logic. Pulse 50 ($t_0$) sets latch 56 to a "high" logic state at output 60 which is connected to one of the two inputs of OR-gate 62 (RCA CMOS Type CD4071B).

The other OR-gate 62 input is monostable 42 output at circuit point 44 (waveform 46). The resulting output 64 of OR-gate 62 is waveform 66. In this manner power is supplied to timing/control logic 6 at point 68 and to the shift-register storage circuits (not shown in FIG. 3) at the proper time after the projectile is fired. This power is supplied continuously until battery 2 is exhausted.

Battery 2 may be a 15 volt silver-oxide type 15.0VS13L manufactured by Power Incorporated, Burnsville, Minn. This silver-oxide battery allows at least 60 days operating time after firing. It is expected that the entire fuze data quantizing system may be fired repeatedly for a total of at least 20 shots before the battery needs replacing. The battery is enclosed in a separate housing for easy replacement.

The ionization switch 10 is used to indicate the time of fuze detonation. The switch 10 is mounted in the front of the fuze impact data encoder screw-in cartridge housing (refer to FIG. 7 in which this cartridge screws into the fuze pellet/booster area). Again referring to FIG. 3, resistor R3 provides a current path when current flows through ionization switch 10 when the gases therein are ionized at the instant of fuze detonation. Switch 10 can be constructed using two closely spaced conductive elements by one skilled in the art. Consequently, at the moment of fuze detonation the logic level at point 70 goes from "low" to "high". This logic transition signifies time $t_1$. Point 70 is connected to point 72 at the input to the timing/control logic 6. Clock 74 may be an RCA type CD4011A CMOS circuit with clock frequency at point 76 determined by the time constant of capacitor 78 and resistor 80. A plurality of outputs 82 from timing/control logic 6 is connected as required to other circuit elements.

Figure 4:
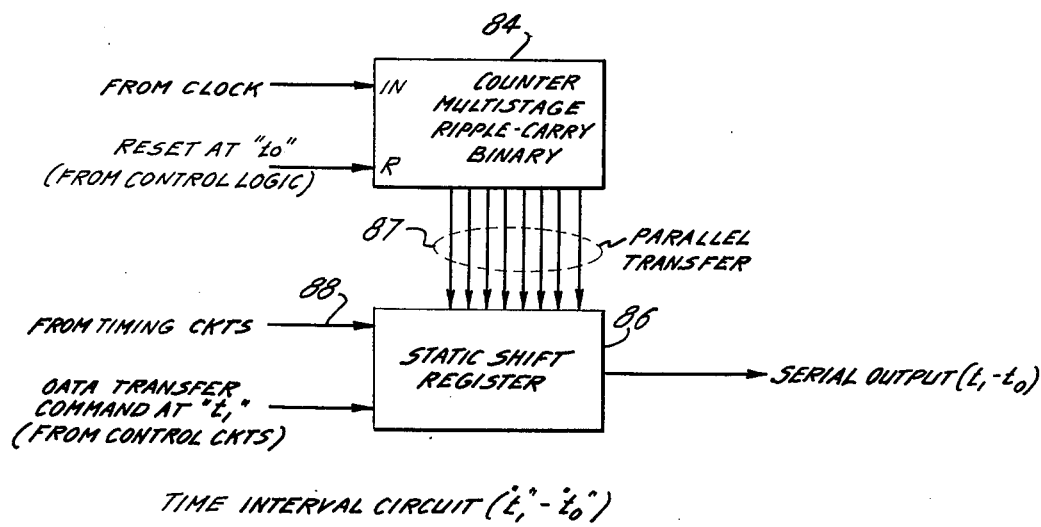
FIG. 4 is a block diagram for determining the time difference between initial impact of the fuze on the target and fuze detonation.

FIG. 4 shows the method for measuring the time interval ($t_1$-$t_0$). Counter 84 is reset to a zero initial condition at the moment of target impact $t_0$. Counter 84 may be a CMOS type CD4020A manufactured by RCA. In the preferred embodiment pulses from the clock circuit 74, at output 76, increments counter 84 every 5 microseconds. When the logic level on data transfer command line goes from "low" to "high" at time $t_1$, parallel-input static shift-register 16 is set to the binary logic state corresponding to the most significant 8 bits of counter 84. In this manner, a parallel transfer of the contents of the counter 84 over lines 87 to shift register 86 is affected. Shift register 86 may be an RCA type CD4021A.

This count now in register 86, corresponding to time inverval ($t_1$-$t_0$), is subsequently transferred serially to a central storage register (not shown in FIG. 4) at a rate determined by clock pulses at point 88.

FIG. 5 shows the details of the accelerometer encoder and storage circuits. Accelerometer 12 generates a voltage that is linearly proportional to the deceleration of the fuze as it penetrates the target. The accelerometer may be a semiconductor straingage type, Model No. GSL-625 (range 0–2500 g's) or Model No. GSL-500 (range 2500–25,000 g's) manufactured by Kulite Corporation, Ridgefield, N.J. These accelerometers have a full-scale output of approximately one-tenth volt (at maximum g's). Operational amplifiers 90 and 92 provide a voltage that is gain set by resistors R5, R6, R7 and R8. These amplifiers must have adequate bandwidth and output slew rate to follow the rate of change of the accelerometer voltage. It is also desired that the amplifiers be capable of single-supply operation. Amplifiers meeting the requirements of the preferred embodiment are Model No. RC3403A manufactured by Ratheon Corporation, Mountain View, Calif. The output of amplifier 92 is fed to the group of thresholds 94 which sense the g-magnitude in increments of 200 g's from 200 to 1000 g's. Resistive dividers R9 and R10 are adjusted during circuit assembly such that the logic switching input voltages of level shifter/buffers 96 and 98 are reached for each 200-g increment. These level shifter/buffers may be RCA Corporation CMOS Model CD40109B. A second function performed by the level shifter/buffers 96 and 98 is that the input switching threshold can be set to a low-voltage (the switching point is one-half of a separate power supply voltage) independently of a higher voltage output logic level. This low-input threshold capability is obtained by using only two operational amplifiers 90 and 92 to cover eleven different G-thresholds over more than a decade range (in the preferred inventive embodiment the range of 200 to 2500 g's is encoded). The level shifter/buffers 96 and 98 provide a sufficiently high voltage level at outputs 100 and 102 to interface with logic circuits 104 and 106. In a manner similar to threshold group 94, threshold group 95 senses the upper six g-levels which include 1200, 1400, 1600, 2000 and 2500 g's.

When a threshold is exceeded, the respective level shifter/buffer output (one of lines 100 and 102) changes from logic state "zero" to logic state "one". The highest g-threshold thus exceeded, therefore, represents the magnitude to within 200 g's (the thresholds are spaced 200 g's apart). For example, if the g-level experienced by the accelerometer were 1250 g's the logic output over lines 100 and 102 would be "00000111111" where the right hand binary digit represents 200 g's, the next digit 400 g's, and so forth. The rightmost logical "one" is defined herein as the "lowest priority digit" and the left-most logical "one" is the highest-priority digit. At lines 100 and 102 the g-level information is represented by eleven binary digits (one for each threshold).

During target impact and penetration twenty-four g-samples are taken over a 700 microsecond interval. Thus, it is desirable to convert the eleven-digit deceleration sample magnitude word to a four-digit word to greatly reduce the required size of the storage shift-register 28.

In order to accomplish said conversion, two priority encoders, RCA CMOS type CD4532B, and one full adder RCA type CD4008A are used. The encoders 104 and 106 encode the highest priority digit at their respective inputs (lines 100 and 102) to two groups of 3-bit codes at output lines 108 and 110 (a total of 6 bits). The 6 bit word (lines 108 and 110) inputs to the full adder 112 which outputs a four digit binary word 114 representing the largest threshold that was exceeded. For example, if 1250 g's were experienced by the accelerometer 12, the four digit word would be "0110" meaning the sixth threshold (1200 g's) was the highest threshold exceeded.

Static shift-register 86 provides temporary storage of each 4-bit deceleration magnitude sample. This 4-bit data is converted from parallel-to-serial binary form by clocking the data through OR-gate 116 to serial shift register 16. OR-gate 116 may be an RCA CMOS CD4071B. The binary data transfers are controlled by timing and control logic 6. After all twenty-four deceleration magnitude samples have been stored in serial shift register 16, the control logic 6 commands temporary storage shift register 118 to transfer the 8-bit time interval ($t_1-t_0$) data to serial register 16. Register 16 may consist of two series-connected CMOS CD4031A integrated circuits.

The information stored in register 16 is read out through interface connector 22 to the ground station unit in serial form over line 28 when a control pulse is supplied from the ground station over line 24. As the binary information is shifted out of register 16, the register output is connected to its input in the "recirculation-mode" (connection not shown) of operation, thereby achieving a "non-destructive" readout.

FIG. 6 shows the portable ground station readout and display for recovering stored fuze impact deceleration and function time data. All data taken during penetration of the fuze into the target is stored in serial binary form in shift register 16 of FIG. 5. After the shell and fuze is recovered, the readout unit is connected to interface connector 22. Remote power and ground is supplied at connector pins c and d. Upon receiving the proper command readout pulses on pin b, the entire serial sequence of data is transferred to serial shift register 26 at a rate determined by remote clock pulses over pin e. Shift register 26 may be two series-connected RCA CMOS Model No. CD4031 integrated circuits. After the data is read into register 26, the register will contain twenty-four 4-bit deceleration magnitude words and one 8-bit word corresponding to the time interval ($t_1-t_0$). Circuitry 120, 122, 124, 126, 128, 130, 132 and 134 decodes and displays this information. This circuitry is routinely designed by one skilled in the art. For each of the indicated time slots 130 the corresponding highest deceleration g-threshold is displayed. The time ($t_1-t_0$) is displayed by L.E.D. (7-segment light-emitting diode) display 134. In the preferred embodiment display 134 reads the ($t_1-t_0$) time interval in increments of five microseconds. Connector 136 also has provisions for pre-flight testing by supplying test signals through a group of pins 136.

Figure 7:
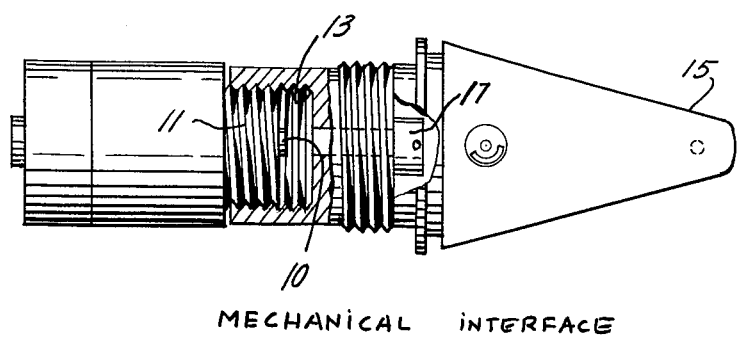
FIG. 7 is a diagrammatic view illustrating the physical outline of the encoder used to monitor the M525 fuze for a 60 mm mortar.

FIG. 7 shows the fuze data quantizing system mechanical interface with a typical fuze (M525PD fuze used on 60 mm mortar). This example is characteristic of many different types of mortar and artillery fuzes in that the booster cup/pellet volume 11 is used for tests of fuze function for certain kinds of targets (hard and soft targets). Since the data encoder housing 13 threads into the fuze, the ionization switch 10 is automatically positioned in the path of gases generated by fuze detonator assembly 17 at the time of fuze 15 detonation. The advantage is that all transducers are readily accommodated in the housing. In addition, one basic housing can be used for several different fuzes used on 60 mm mortar rounds to 8" artillery projectile through the use of a threaded adaptor whose inside threads accommodate the encoder housing and outside threads fit into the fuze booster cup area 11.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

I claim:

1. A fuze data quantizing system for sampling and recording projectile fuze data during a period of target impact and penetration, comprising:
   (a) a first channel for detecting and measuring a functional interval of said fuze during the impact; and
   (b) a second channel detecting and recording g-forces versus time;
   (c) shift register storage means for serially digitally storing information detected by said first and second channels; and
   (d) time interval counter means for timing the sampling and quantizing data processed by said first and second channels.

2. A fuze impact data-encoding system for sampling and recording a deceleration profile of a projectile at a plurality of discrete time intervals and for measuring and recording a time difference between initial impact time $t_0$ and a fuze detonation time $t_1$ of a fuze of said projectile, comprising:
   (a) a power source to energize said system;
   (b) a g-switch electrically coupled to power source, said switch being momentarily closed to initiate an operating sequence during first motion of said projectile's fuze time $t_0$;
   (c) a timing and control logic unit connected in combination with a time interval counter which is coupled in series with said g-switch to indicate a time difference $t_1-t_0$;
   (d) accelerometer means for providing a voltage output proportional to a deceleration magnitude experienced in a fuze of said projectile;
   (e) an amplitude encoder electrically connected to the output of said accelerometer, said amplitude encoder generating a binary number representing the highest threshold exceeded during a particular sample time;
   (f) a shift-register electrically coupled to an output of said amplitude encoder, said shift register storing information in serially form; and
   (g) interface connector coupled to said shift-register to transform a stored information in said shift register to a ground station read-out unit.

3. A fuze impact data-encoding system as recited in claim 2 including a time interval counter having an input electrically connected to said timing and control logic unit and an output electrically coupled to said shift register, said time interval counter transferring a binary signal in serial digital form representing said time interval $t_1-t_0$.

4. A fuze impact data-encoding system as recited in claim 3 further including an ionization switch operatively disposed in alignment with a fuze detonator assembly for detecting ionized gases generated when said detonator is fired at said fuze detonation time $t_1$.

5. A method for sampling projectile fuze data generated by a fuze of a projectile during a period of target impact and penetration, and recording a time difference between initial impact time $t_0$ and a fuze detonation time $t_1$, comprising:

(a) selectively energizing logic circuits and a transducer required to operate during sampling, processing and storage of data during a period of target impact and penetration;

(b) resetting a timing and control logic unit, a time interval counter and a shift register to an initial state after said projectile is fired but prior to target impact;

(c) initiating said time interval counter and an amplitude encoder at a time $t_0$ when the fuze first strikes a target, by a momentary closure of a g-switch;

(d) providing timing and control for transfer of binary information in a logical format and in an ordered sequence;

(e) deriving a logic pulse corresponding to the time of impact $t_0$;

(f) deriving a logic indication at the time of fuze detonation $t_1$ by conduction of an ionization switch, and obtaining a binary count corresponding to a time interval $t_1-t_0$; and (g) providing a central timing base reference for the deceleration and $t_1-t_0$ measurements.

* * * * *